June 16, 1925.
S. N. HURT
RACK FOOT OR SUPPORT
Filed Dec. 10, 1919
1,542,249
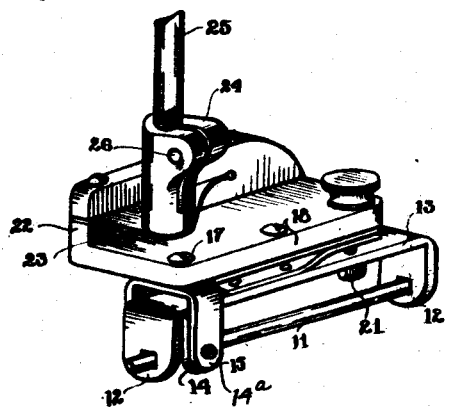
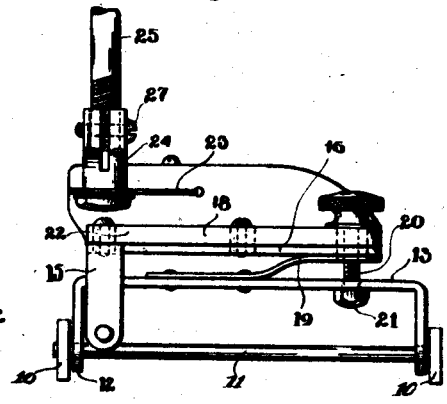
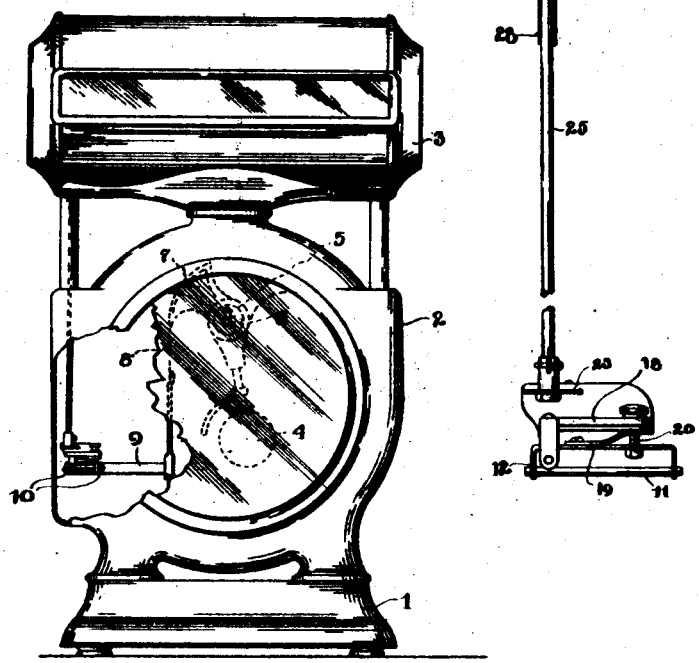
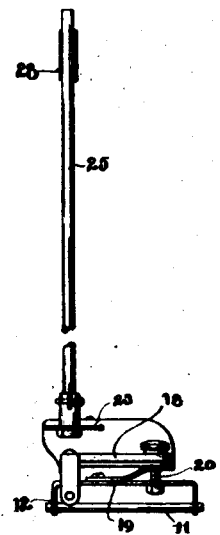

Patented June 16, 1925.

1,542,249

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

RACK FOOT OR SUPPORT.

Application filed December 10, 1919. Serial No. 343,915.

*To all whom it may concern:*

Be it known that I, SAMUEL N. HURT, a citizen of the United States, residing at Toledo, in the county of Lucas and State of Ohio, have invented certain new and useful Improvements in Rack Feet or Supports, of which the following is a specification.

This invention relates to weighing scales, and particularly scales of the type in which an indicator is operated from the weighing mechanism by means of a rack meshing with a pinion connected to the indicator.

The object of the invention is to provide an improved mounting for the rack bar whereby the rack and pinion may be readily brought into alignment to secure substantially perfect mesh, and the object is accomplished by making the connection between the rack bar and the weighing mechanism adjustable angularly as well as perpendicularly relative to the plane of movement of the part to which it is connected.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a rear elevation of a scale with the housing broken away to show the rack foot mounting embodying my invention, part of the weighing mechanism being shown in dotted lines;

Figure 2 is an enlarged perspective view of the rack foot mounting;

Figure 3 is a rear elevation of the rack foot shown in Figure 2; and

Figure 4 is an elevation of the rack foot, rack bar and pinion, part of the rack bar being broken out.

For exemplification, I have shown my invention as applied to a scale having a base 1 which supports a housing 2 containing the load-offsetting mechanism of the scale. The indicator is of the type having a cylindrical chart, and is contained within a substantially cylindrical casing 3 mounted upon the housing 2. The load-offsetting mechanism shown in dotted lines in Figure 1 consists essentially of a pendulum 4 suspended from knife edge pivots 5 rockably mounted in bearings 6, the bearings 6 being rigidly secured upon a bracket extending into the housing 2. The pendulum 4 has a power sector 7 rigidly connected thereto, and a flexible steel band or ribbon 8 is fastened at its upper end to the power sector and passes downwardly over the curved face thereof, being connected at its lower end to the nose of the main lever of the scale.

Extending laterally from the nose end of the main scale lever and rigid with respect thereto is an arm 9 carrying a pair of rearwardly projecting perforated lugs 10, to which the rack foot embodying my invention is pivoted, a rod 11 passing through the lugs 10 and through a pair of ears 12 depending from the ends of the plate 13. The plate 13 has a second pair of ears 14 depending from its sides, (see Figure 2), through which passes a pintle 14ª forming a fulcrum for the plate 16, ears 15 depending from this plate fitting over the pintle. The plate 16 is secured by means of screws 17 to a horizontally-extending portion of a comparatively heavy rack foot 18. As shown in dotted lines in Figure 3, the openings in the member 18 through which the screws 17 pass are elongated, so that a lateral adjustment of the rack foot may be made by loosening the screws and moving the member 18 laterally. The rack bar may thus be brought into the plane of the pinion. A flat spring 19 is riveted upon the upper surface of the plate 13 and serves to yieldingly hold the ends of the plates which are not pivoted together in spaced relation (see Figure 3). A bolt 20 passes downwardly through aligned apertures in the rack foot and the plate 16 and engages a threaded opening in the plate 13, and a lock nut 21 is threaded upon the lower end of the bolt 20. By turning the bolt so as to screw it into the plate 13 the free ends of the plates 13 and 16 are drawn toward each other against the tension of the spring 19 (which has an elongated opening surrounding the bolt 20 to permit the spring to slide along the lower surface of the plate 16), and the rack foot is thereby adjusted angularly with respect to the plane of movement of the main scale lever. By turning the lock nut 21 the parts may be secured in adjusted position.

The rack foot 18 is herein shown as angular in cross section, and comprising a substantially horizontal lower portion and a substantially perpendicular side portion 22. Suitably clamped, as in a kerf formed in the side portion 22 of the rack foot, is a resilient plate 23 which extends outwardly over the pivoted ends of the plates 13 and 16 and yieldingly supports the threaded lower end of the indicator operating rack bar 25, an internally-threaded member 24 split longitudinally and provided with apertured lugs 26 being arranged to clamp the rack bar firmly to the plate 23. The rack bar 25 may thus be threaded into the member 24 and turned to the proper position for its teeth to correctly align and mesh with the teeth of the pinion 28 and a locking screw, as 27, turned to clamp the rack bar against accidental turning movement.

The center of gravity of the rack foot is normally arranged in a plane but slightly out of alignment with that of the rod 11, and is adjusted angularly so that the weight of the rack foot tends to swing the rack bar forwardly to hold the rack in mesh with the pinion 28. Lateral adjustment can be effected by turning the bolt 20, whereby the spring 19 swings the rack bar laterally until it lies in the desired plane parallel to the plane of movement of the main scale lever and perpendicular to the axis of the pinion 28.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a lever, a rack bar connected thereto, means for adjusting said rack bar angularly relative to the plane of movement of said lever, and means for adjusting said rack bar bodily laterally.

2. In a scale, in combination, a lever, a rack bar connected thereto, and means for adjusting said rack bar angularly relative to the plane of movement of said lever, said means comprising a member connected to said lever, a member connected to said rack bar, a pivotal connection between said members, and means providing for limited relative pivotal movement of said members.

3. In a scale, in combination, a lever, a rack bar connected thereto, means for adjusting said rack bar relative to the plane of movement of said lever, comprising a member connected to said lever, a member connected to said rack bar, a pivotal connection between said members, a spring urging said members to pivotal movement in one direction, and a screw for causing relative pivotal movement of said members in the opposite direction.

4. In a rack adjusting device, in combination, a rack foot, a member secured thereto having an ear thereon, a second member having an ear overlapping and pivoted to the first said ear, and a screw connecting said members whereby they may be relatively moved about the pivotal axis.

5. In a rack adjusting device, in combination, a rack foot, a member secured thereto having a pair of ears thereon, a second member having a pair of ears overlapping and pivoted to the first said ears, a screw connecting said members, whereby they may be relatively moved about the pivotal axis, and a flat spring secured to one of said members and bearing against the other of said members.

6. In a scale, in combination, a lever, a rack, means connecting said rack to said lever comprising a member pivoted to said lever, and a rack foot connected to said member and adjustable relative thereto about an axis parallel to the plane of movement of said lever, said rack being mounted on said foot and adjustable relative thereto about an axis perpendicular to the axis of adjustment between said member and said foot.

7. In a scale, in combination, a lever, a threaded rack bar, and means for connecting said rack bar to said lever, comprising an internally-threaded member receiving the threaded end of said rack bar, means for locking said rack bar and said internally-threaded member against relative movement, a rack foot connected to said internally-threaded member, a plate pivotally connected to said lever, and an angularly-adjustable connection between said rack foot and said plate.

8. The combination in a scale, of a lever, a rack bar, and a mounting for said rack bar upon said lever, said mounting including means whereby said rack bar may be adjusted angularly, and means whereby said rack bar may be adjusted bodily laterally.

9. The combination in a scale, of a lever, a rack bar, a pinion, and a connection between the rack bar and lever, including means whereby the rack bar may be swung toward or away from the pinion, and means whereby the rack bar may be moved in a lateral direction parallel with the axis of the pinion.

10. The combination in a scale, of a lever, a rack bar, a pinion, and a connection between the rack bar and lever whereby the rack may be swung toward and away from the pinion and an intermediate connection whereby the rack may be swung in a direction perpendicular to that permitted by the first-mentioned connection and means for retaining the rack in selected angular position.

SAMUEL N. HURT.

Witnesses:
C. O. MARSHALL,
C. E. WILCOX.